(12) United States Patent
Yokoue et al.

(10) Patent No.: US 12,709,025 B2
(45) Date of Patent: Aug. 18, 2026

(54) SUCTION PAD

(71) Applicant: Yanmar Holdings Co., Ltd., Osaka (JP)

(72) Inventors: Toshiyuki Yokoue, Osaka (JP); Toru Kuga, Osaka (JP); Miyuki Saiki, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 972 days.

(21) Appl. No.: 17/971,476

(22) Filed: Oct. 21, 2022

(65) Prior Publication Data

US 2023/0125302 A1 Apr. 27, 2023

(30) Foreign Application Priority Data

Oct. 26, 2021 (JP) ................................. 2021-174380

(51) Int. Cl.
*B25J 15/06* (2006.01)

(52) U.S. Cl.
CPC ................................ *B25J 15/0691* (2013.01)

(58) Field of Classification Search
CPC ............................ B25J 15/0691; B32B 27/40
See application file for complete search history.

(56) References Cited

U.S. PATENT DOCUMENTS 9,975,255 B1 * 5/2018 Bosboom ............. B25J 15/0683
2020/0262087 A1 * 8/2020 Douglas ............... B25J 15/0057

FOREIGN PATENT DOCUMENTS

JP H08-294891 A 11/1996
JP H09-028120 A 2/1997
JP 2008-074565 A 4/2008
JP 5163541 B2 3/2013
WO WO-2016056115 A1 * 4/2016 .......... B25J 15/0666
WO WO-2020261013 A1 * 12/2020 ............ B32B 27/40

OTHER PUBLICATIONS

English translation of WO 2016056115 (Year: 2016).*
Japanese Office Action dated Sep. 3, 2024, issued in JP Application No. 2021-174380.

* cited by examiner

*Primary Examiner* — Gene O Crawford
*Assistant Examiner* — Sydney Jeanine Simmons
(74) *Attorney, Agent, or Firm* — NORTON ROSE FULBRIGHT US LLP

(57) ABSTRACT

A suction pad configured to suck and hold a fruit includes a pad main body made from an elastically deformable member and having a held base end portion; a hollow formed inside the pad main body so as to extend from a base end side to a tip end side; and a hole configured to communicate with the hollow and being open to a tip end portion of the pad main body, and an opening diameter of the suction hole is smaller than an inner diameter of the hollow.

7 Claims, 4 Drawing Sheets

5
9
1
10
3
4
7
8
2
6
F1

5
9
1
10
3
4
7
8
2
6
F1

5
9
1
3
4
10
7
8
2
6
F1

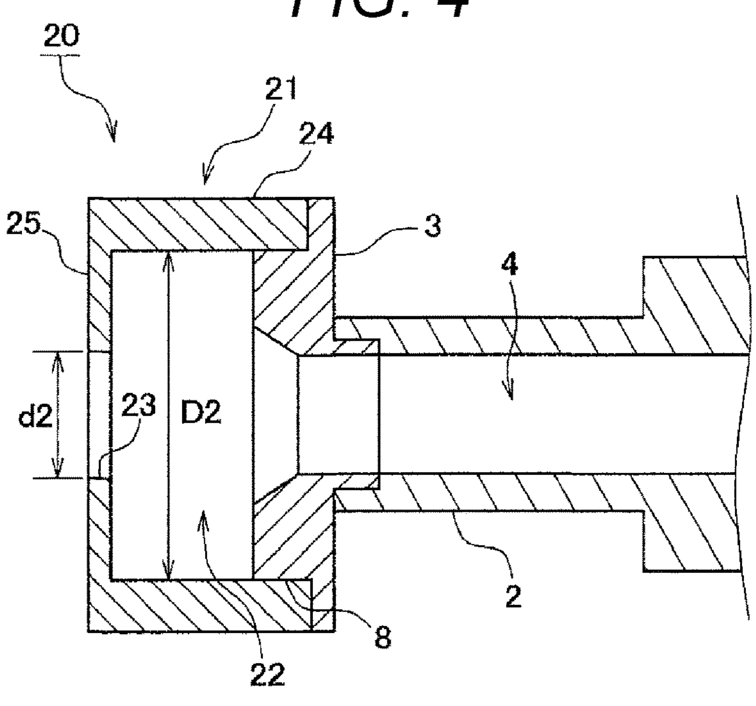
FIG. 5
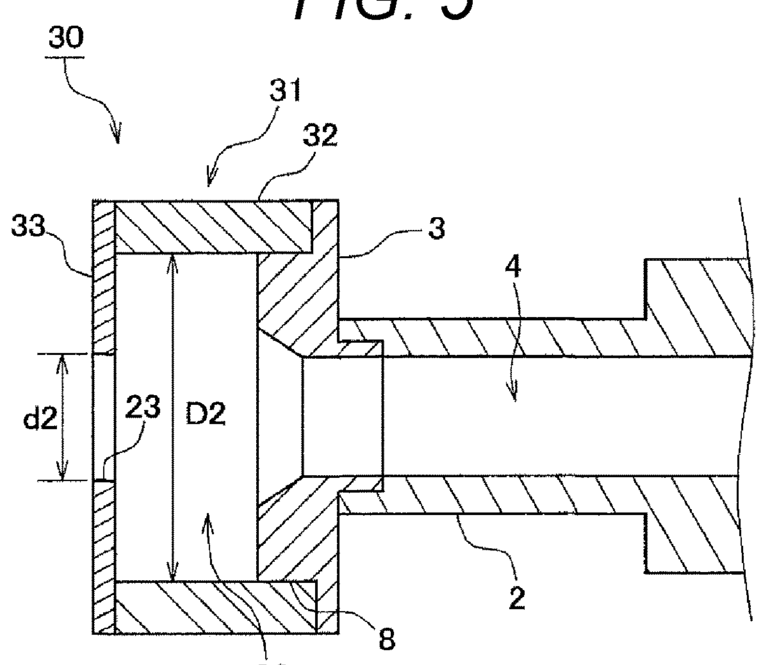

SUCTION PAD

CROSS-REFERENCE TO RELATED APPLICATIONS

This application claims priority under 35 U.S.C. § 119 to JP Application No. 2021-174380 filed Oct. 26, 2021, the entire contents of which are hereby incorporated by reference.

TECHNICAL FIELD

The present invention relates to a suction pad for sucking and holding an object.

BACKGROUND ART

As means for holding an object to be arbitrarily operated, a suction pad that vacuum-sucks the object has been conventionally used (see, for example, Patent Document 1). As illustrated in FIG. 1 of Patent Document 1, a suction pad (vacuum suction pad 10) includes a bellows (skirt 2) connected to a vacuum source device, a pad holder (edge holder 4) provided at a lower end of the bellows, and an annular pad main body (edge 5) made from soft rubber and fitted to the pad holder. In a case where a flat plate-shaped uneven workpiece is sucked by using the vacuum suction pad 10, suction from the vacuum source device is started, and the pad main body (edge 5) is pressed against the workpiece. Then, as illustrated in FIG. 4(a), unevenness on a surface of a workpiece t is absorbed by elastic deformation of the pad main body (edge 5), and thus the workpiece t is favorably sucked by the pad main body. Further, as illustrated in FIG. 4(b), displacement or inclination of the workpiece t is followed by deformation of the bellows (skirt 2), and thus the workpiece t is favorably sucked by the pad main body.

PRIOR ART DOCUMENT

Patent Document

Patent Document 1: Japanese Patent No. 5163541

SUMMARY OF INVENTION

Technical Problem

However, in the conventional suction pad, there has been a problem that it is difficult to favorably suck an object that does not return sufficient reaction force even when the pad main body is pressed against the object. For example, in a case where the object is a tree fruit, the fruit moves to escape when the pad main body is pressed against the fruit. Thus, sufficient reaction force is not returned from the fruit. In this case, an elastically deformable amount of the pad main body made from soft rubber is small, and thus it is difficult to completely absorb large unevenness existing on a surface of the fruit. Therefore, a gap tends to be generated between the pad main body and the surface of the fruit, and thus it is difficult to favorably suck the fruit by using the suction pad.

The present invention has been made in view of such circumstances, and an object thereof is to provide a suction pad capable of favorably sucking an object that does not return sufficient reaction force even when a pad main body is pressed against the object.

Solution to Problem

A suction pad according to one aspect of the present invention is a suction pad for sucking and holding an object, the suction pad including: a pad main body that is made from an elastically deformable member and has a held base end portion; a hollow that is formed inside the pad main body so as to extend from a base end side to a tip end side; and a suction hole that communicates with the hollow and is open to a tip end portion of the pad main body. An opening diameter of the suction hole is smaller than an inner diameter of the hollow.

In the suction pad according to one aspect of the present invention, the tip end portion of the pad main body may be elastically deformable.

In the suction pad according to one aspect of the present invention, the tip end portion of the pad main body may be thinner than the base end portion.

In the suction pad according to one aspect of the present invention, the elastically deformable member may include a sponge.

In the suction pad according to one aspect of the present invention, the pad main body may include the tip end portion made from a sponge having open cells and the base end portion made from a sponge having closed cells.

In the suction pad according to one aspect of the present invention, the pad main body may include, at the tip end portion, a tapered portion in which an inner diameter of the hollow decreases from the base end side toward the tip end side.

In the suction pad according to one aspect of the present invention, the tapered portion may be thinner on the tip end side than on the base end side.

Advantageous Effects of Invention

According to the suction pad according to one aspect of the present invention, it is possible to provide a suction pad capable of favorably sucking: even an object that does not return sufficient reaction force even when a pad main body is pressed against the object; or an object having large unevenness on its surface.

BRIEF DESCRIPTION OF DRAWINGS

FIG. 4 is a schematic cross-sectional view illustrating a vacuum suction pad 20 according to a second embodiment of the present invention; and FIG. 5 is a schematic cross-sectional view illustrating a vacuum suction pad 30 according to a modification example of the second embodiment.

DESCRIPTION OF EMBODIMENTS

Hereinafter, a suction pad according to embodiments of the present invention will be described with reference to the drawings. In the present embodiments, a vacuum suction pad will be described as an example of the suction pad.

(Configuration of Vacuum Suction Pad According to First Embodiment)

Figure 1:
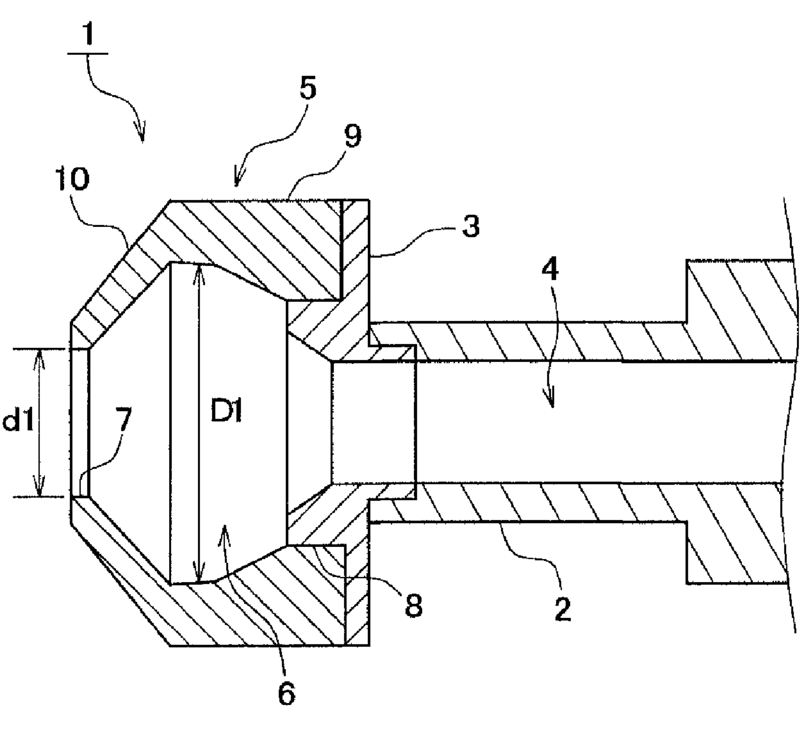
FIG. 1 is a schematic cross-sectional view illustrating a vacuum suction pad 1 according to a first embodiment of the present invention.

First, a configuration of a vacuum suction pad according to a first embodiment of the present invention will be described. FIG. 1 is a schematic cross-sectional view illustrating a vacuum suction pad 1 according to the first embodiment. The vacuum suction pad 1 includes a holder support 2, a pad holder 3, an air channel 4, a pad main body 5, a hollow 6, and a suction hole 7.

The holder support 2 supports the pad holder 3. The holder support 2 is made from a hard member such as resin or metal and a flexible member such as rubber or bellows and, as illustrated in FIG. 1, has a cylindrical outer shape and extends from a base end side toward a tip end side of the vacuum suction pad 1. In the present invention, the "base end side" means a side away from an object to be sucked, and the "tip end side" means a side closer to the object.

The pad holder 3 holds the pad main body 5. As illustrated in FIG. 1, the pad holder 3 is a disk-shaped member made from a hard member such as resin or metal, and a pad mounting portion 8 is formed on an outer peripheral edge portion of the pad holder over an entire circumference in a circumferential direction. The pad holder 3 formed as described above is fixed to a tip end portion of the holder support 2.

The air channel 4 functions as a channel for discharging air inside the pad main body 5 to the outside. As illustrated in FIG. 1, the air channel 4 extends from the base end side to the tip end side so as to penetrate the holder support 2 and the pad holder 3. An upstream end portion of the air channel 4 is connected to the hollow 6. Meanwhile, although not illustrated in detail in the figure, a downstream end portion of the air channel 4 is connected to a vacuum source device such as a vacuum pump provided outside.

The pad main body 5 functions as a contact portion of the vacuum suction pad 1 with the object. The pad main body 5 is made from a closed cell sponge as an elastically deformable member, and, as illustrated in FIG. 1, includes: a main body portion 9 forming a base end portion of the pad main body 5; and a tapered portion 10 forming a tip end portion of the pad main body 5. The main body portion 9 has a cylindrical outer shape and gradually increases in thickness from a tip end side toward a base end side thereof. Therefore, the base end side of the main body portion 9 is less likely to be elastically deformed than the tip end side thereof. Meanwhile, the tapered portion 10 has a tapered outer shape of which diameter gradually decreases from a base end side toward a tip end side thereof and gradually decreases in thickness from the base end side connected to the main body portion 9 toward the tip end side. Therefore, the tapered portion 10 is easily elastically deformed, as compared with the main body portion 9, and is gradually more easily elastically deformed toward the tip end side. That is, the pad main body 5 is most easily elastically deformed at an edge portion of the suction hole 7. Examples of the closed cell sponge forming the pad main body 5 include closed cell sponges such as polyurethane, silicone rubber, ethylene propylene rubber, and fluorine rubber and cellulose sponges made from plant fibers.

The hollow 6 facilitates elastic deformation of the pad main body 5 toward the inside. As illustrated in FIG. 1, the hollow 6 is a circular cross-section hole formed inside the pad main body 5 and is open to a base end surface of the pad main body 5. An inner diameter D1 of the hollow 6 changes in size depending on an axial position in accordance with a thickness of the pad main body 5. Specifically, the inner diameter D1 of the hollow 6 gradually increases from an opening toward the tip end side, is the largest at a connecting portion between the main body portion 9 and the tapered portion 10 of the pad main body 5, gradually decreases from the connecting portion toward the tip end side, and is the smallest at the edge portion of the suction hole 7.

The suction hole 7 functions as a channel for sucking outside air into the pad main body 5. As illustrated in FIG. 1, the suction hole 7 penetrates a tip end surface of the pad main body 5 and allows the hollow 6 to communicate with the outside. The suction hole 7 is formed in a circular cross-section and has an opening diameter d1. Here, because the inner diameter D1 of the hollow 6 is the smallest at the edge portion of the suction hole 7 as described above, the opening diameter d1 of the suction hole 7 is set to be smaller than the inner diameter D1 of the hollow 6.

Effects of First Embodiment

Next, effects of the vacuum suction pad 1 according to the first embodiment will be described. In the present embodiment, there will be described an example where a tree fruit is sucked by using the vacuum suction pad 1. FIGS. 2A to 3C are explanatory views illustrating a procedure for sucking a fruit F1 or fruit F2 by using the vacuum suction pad 1.

Figure 2A:
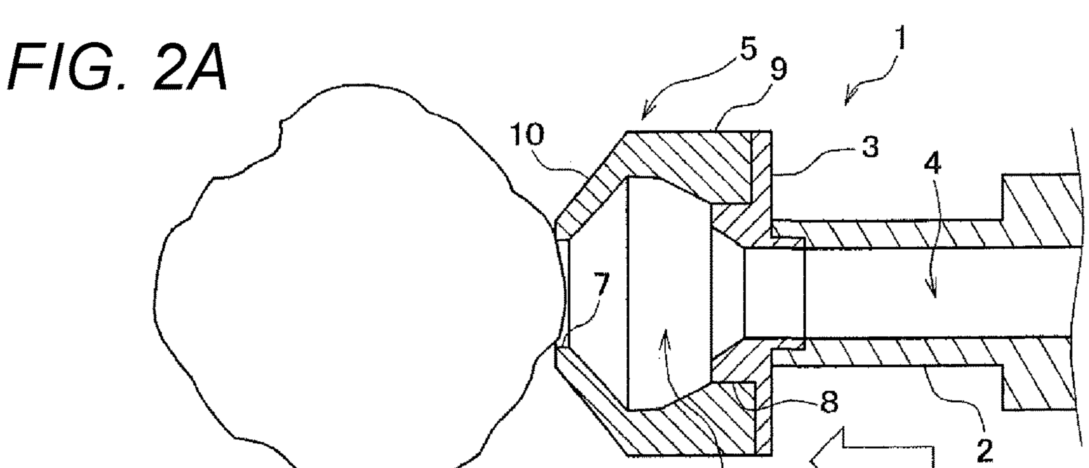
FIGS. 2A to 2C show an explanatory view illustrating a procedure for sucking a fruit F1 by using the vacuum suction pad 1.

First, a case of sucking the fruit F1 having large unevenness on its surface will be described. In this case, a user of the vacuum suction pad 1 first operates the vacuum source device. Accordingly, air inside the hollow 6 is discharged to the outside through the air channel 4 to reduce an internal pressure of the hollow 6, and thus the vacuum suction pad 1 starts sucking outside air through the suction hole 7. In that state, the user moves the vacuum suction pad 1 in a direction of approaching the fruit F1 and lightly presses a portion, near the suction hole 7, of the pad main body 5 against the fruit F1 as illustrated in FIG. 2A. Therefore, in the pad main body 5, a part, in the circumferential direction, of the edge portion of the suction hole 7 is brought into contact with the fruit F1 having an irregular surface shape, and the remaining part is separated from the fruit F1.

Figure 2B:
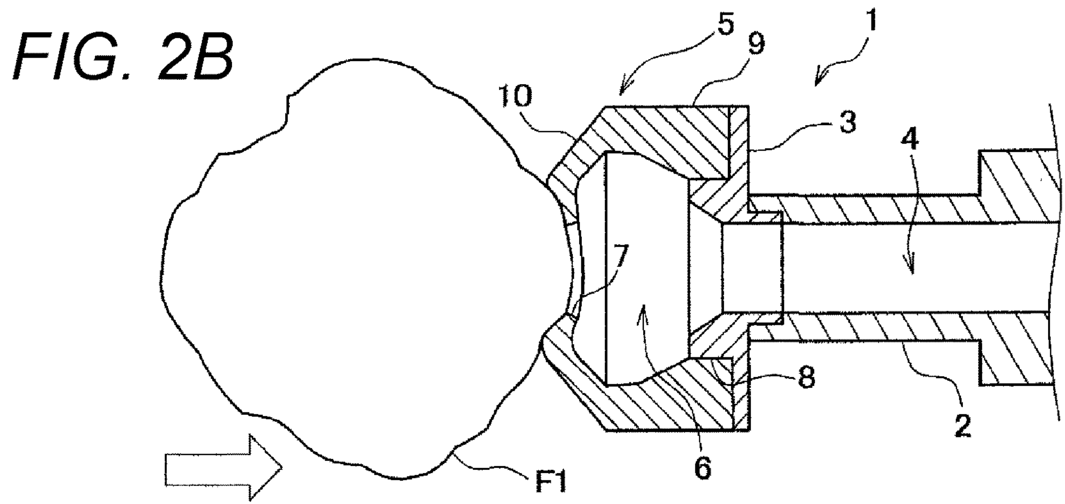

Next, the user further moves the vacuum suction pad 1 in the direction of approaching the fruit F1, thereby pushing the pad main body 5 to the fruit F1. Herein, because the pad main body 5 is made from a closed cell sponge, the pad main body 5 is easily elastically deformed, and the edge portion of the suction hole 7 that is formed to be thinnest is most easily elastically deformed. Therefore, even when reaction force is slightly returned from the fruit F1, as illustrated in FIG. 2B, the pad main body 5 is elastically deformed such that the edge portion of the suction hole 7 is crushed into the hollow 6, and a region in contact with the fruit F1 gradually expands radially outward. Then, when the contact region between the pad main body 5 and the fruit F1 expands as described above, suction force to the fruit F1 increases, and thus the contact region with the fruit F1 further expands radially outward as the pad main body 5 is further elastically deformed. Thereafter, as illustrated in FIG. 2B, the edge portion of the suction hole 7 of the pad main body 5 is brought into close contact with the fruit F1 over the entire circumference in the circumferential direction, without any gap. Therefore, initial suction of the fruit F1 by the vacuum suction pad 1 is achieved.

Figure 2C:
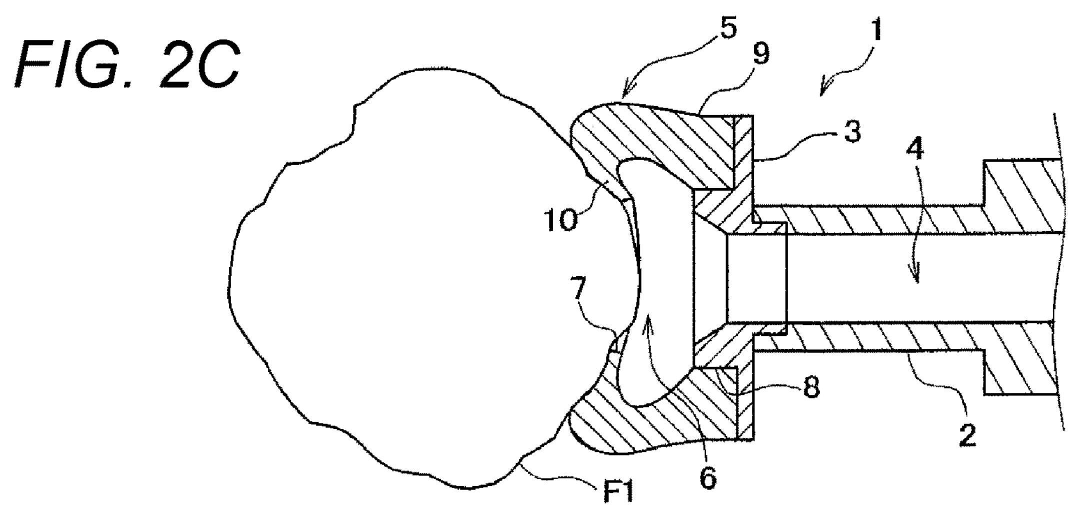

Even when the initial suction is achieved, the suction force to the fruit F1 increases as the contact region between the pad main body 5 and the fruit F1 expands. Thus, the contact region between the pad main body 5 and the fruit F1 further expands radially outward as the pad main body 5 is further elastically deformed. However, the pad main body 5 is less likely to be elastically deformed on the base end side than on the tip end side. That is, the tapered portion 10 of the pad main body 5 gradually increases in thickness from the tip end side toward the base end side. The main body portion 9 of the pad main body 5 is thicker than the tapered portion 10 and gradually increases in thickness from the tip end side toward the base end side. Therefore, as illustrated in FIG. 2C, when the elastic deformation of the pad main body 5 proceeds to a predetermined position of the main body portion 9 and rigidity of the pad main body 5 becomes high enough to withstand the suction force, the elastic deformation of the pad main body 5 stops, and complete suction of the fruit F1 by the vacuum suction pad 1 is achieved. Accordingly, the fruit F1 is immovably held, and thus the user can perform an arbitrary operation on the fruit F1.

As described above, in the pad main body 5, the opening diameter d1 of the suction hole 7 is set to be smaller than the inner diameter D1 of the hollow 6. Thus, even in a case where the fruit F1 having large unevenness on the surface is sucked, the edge portion of the suction hole 7 can be easily brought into close contact with a narrow region on the surface of the fruit F1 over the entire circumference in the circumferential direction. Therefore, it is possible to easily achieve the initial suction of the fruit F1 by the vacuum suction pad 1, regardless of existence of the large unevenness. Further, after the initial suction is achieved, the contact region with the fruit F1 is increased by the elastic deformation of the pad main body 5, and the suction force to the fruit F1 increases accordingly. Therefore, when the elastic deformation of the pad main body 5 stops and the complete suction of the fruit F1 by the vacuum suction pad 1 is achieved, the fruit F1 is reliably held with large suction force. As described above, the vacuum suction pad 1 of the present invention can easily achieve the initial suction and can also secure large suction force when the complete suction is achieved.

Figure 3A:
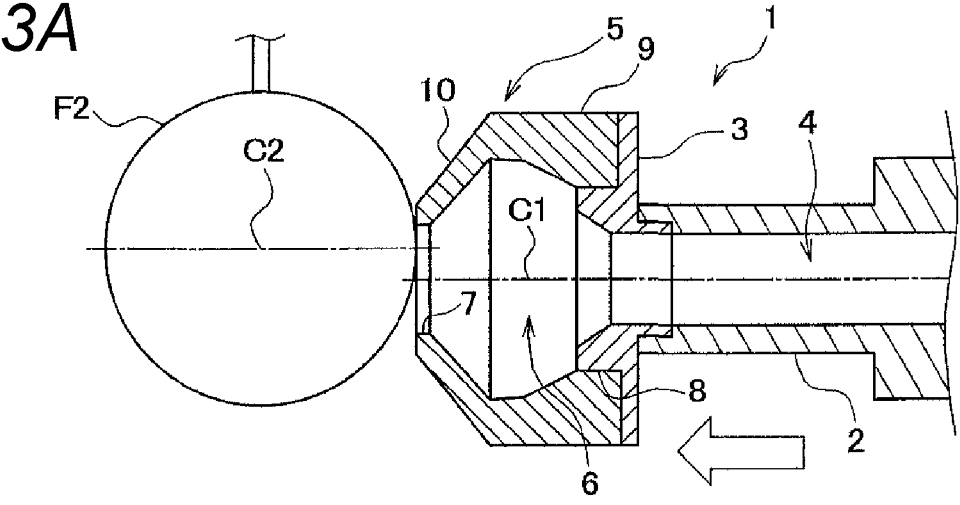
FIGS. 3A to 3C show an explanatory view illustrating a procedure for sucking a fruit F2 by using the vacuum suction pad 1.

Next, a case of sucking a fruit F2 displaced from a center axis C1 of the vacuum suction pad 1 will be described. In this case, the user first activates the vacuum source device in a similar manner to the above and starts suction through the suction hole 7. In that state, as illustrated in FIG. 3A, the user brings the vacuum suction pad 1 close to the fruit F2 (which has a substantially spherical shape with no unevenness on its surface) and presses a portion, near the suction hole 7, of the pad main body 5 against the fruit F2. At this time, a position of the center axis C1 of the vacuum suction pad 1 is displaced from a position of a center axis C2 of the fruit F2 in some cases. In that case, in the pad main body 5, a part, in the circumferential direction, of the edge portion of the suction hole 7 is brought into contact with the fruit F2, and the remaining part is separated from the fruit F2.

Figure 3B:
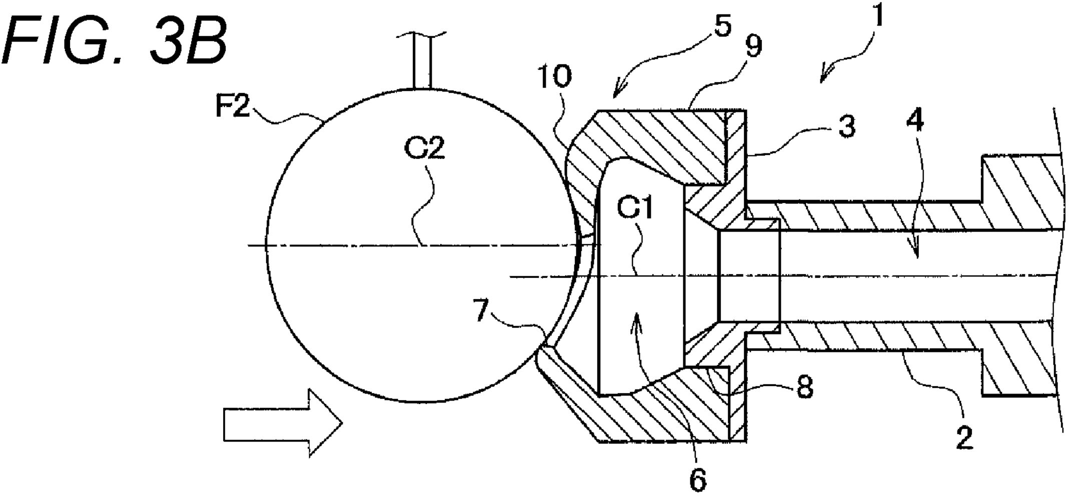

In a state in which the center axis C1 and the center axis C2 do not match as described above, as illustrated in FIG. 3B, the user further moves the vacuum suction pad 1 in a direction of approaching the fruit F2, thereby pushing the pad main body 5 to the fruit F2. Therefore, the pad main body 5 is elastically deformed such that a portion in contact with the fruit F2 is crushed into the hollow 6, and a region in contact with the fruit F2 gradually increases radially outward. Thereafter, as illustrated in FIG. 3B, in the pad main body 5, the edge portion of the suction hole 7 is brought into close contact with the fruit F2 over the entire circumference in the circumferential direction without any gap while the center axis C1 of the pad main body 5 and the center axis C2 of the fruit F2 do not match. Therefore, initial suction of the fruit F2 by the vacuum suction pad 1 is achieved.

Figure 3C:
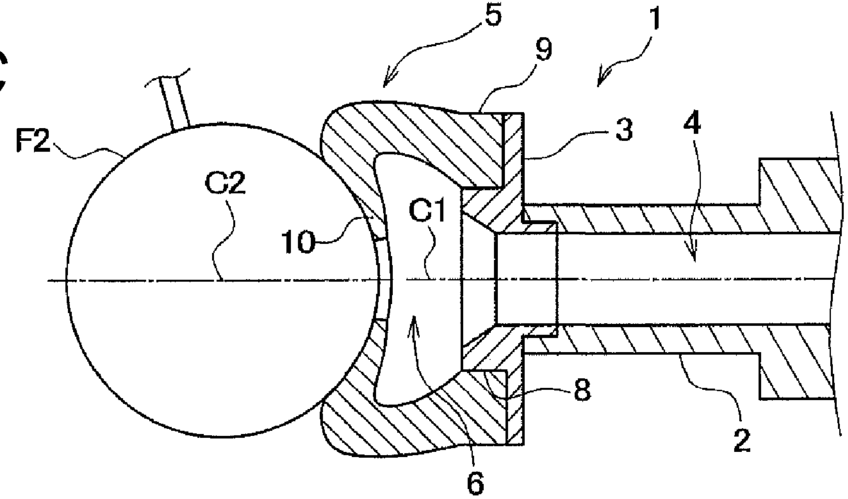

Thereafter, as described above, the suction force to the fruit F2 increases as the contact region between the pad main body 5 and the fruit F2 expands. Thus, the contact region between the pad main body 5 and the fruit F2 further expands radially outward as the pad main body 5 is further elastically deformed. Further, as illustrated in FIG. 3C, when the elastic deformation of the pad main body 5 proceeds to a predetermined position of the main body portion 9 and rigidity of the pad main body 5 becomes high enough to withstand the suction force, the elastic deformation of the pad main body 5 stops, and complete suction of the fruit F2 by the vacuum suction pad 1 is achieved.

Here, the pad main body 5 gradually increases in thickness from the tip end side toward the base end side, that is, is gradually less likely to be elastically deformed toward the base end side. Therefore, as the elastic deformation of the pad main body 5 expands toward the base end side, a degree of elastic deformation of the pad main body 5 becomes uniform, regardless of a circumferential position thereof. Accordingly, in a process from the initial suction to the complete suction of the fruit F2, a relative positional relationship between the fruit F2 and the vacuum suction pad 1 gradually changes such that the center axis C2 of the fruit F2 approaches the center axis C1 of the vacuum suction pad 1. Then, as illustrated in FIG. 3C, when the complete suction is achieved, the center axis C2 of the fruit F2 matches the center axis C1 of the vacuum suction pad 1. Therefore, the user can accurately operate the fruit F2 held on the center axis C1 of the vacuum suction pad 1.

As described above, even in a case of sucking the fruit F2 displaced from the center axis C1, the vacuum suction pad 1 of the present invention can completely suck the fruit F2 on the center axis C1 by changing the relative positional relationship with the fruit F2 by using a characteristic of the pad main body 5 that is easily elastically deformed. Therefore, it is unnecessary to provide a bellows (not illustrated) in the holder support 2 in FIG. 1 in order to change a direction of the vacuum suction pad 1 to cope with the displacement of the fruit F2. This makes it possible to simplify a configuration of the vacuum suction pad 1.

Modification Example of First Embodiment

In the present embodiment, the pad main body 5 is made from a closed cell sponge. However, the pad main body 5 may be made from a porous member other than the closed cell sponge or a hollow balloon-shaped silicone molded article (e.g. BALLOON HAND (registered trademark)) as long as the pad main body 5 can be elastically deformed and ensure airtightness inside.

In the present embodiment, the tapered portion 10 serving as the tip end portion of the pad main body 5 is thinner than the main body portion 9 serving as the base end portion of the pad main body 5 so that the tip end portion is more easily elastically deformed than the base end. However, instead of or in combination with this, the tapered portion 10 may be made from a material having a Young's modulus lower than that of the main body portion 9 so that the tip end portion of the pad main body 5 is more easily elastically deformed than the base end portion thereof.

In the present embodiment, the tapered portion 10 is gradually thinner from the base end side toward the tip end side so that the tip end side of the tapered portion 10 is more easily elastically deformed than the base end side thereof. However, instead of or in combination with this, the tip end side of the tapered portion 10 may be made from a material having a Young's modulus lower than that of the base end side thereof so that the tip end side is more easily elastically deformed than the base end side.

In the present embodiment, the main body portion 9 is gradually thicker from the tip end side toward the base end side so that the base end side of the main body portion 9 is less likely to be elastically deformed than the tip end side thereof. However, instead of or in combination with this, the base end side of the main body portion 9 may be made from a material having a Young's modulus higher than that of the tip end side thereof so that the base end side is less likely to be elastically deformed than the tip end side.

In the present embodiment, the holder support 2 is made from a hard member such as resin or metal. However, although not illustrated in detail in the drawings, a bellows may be provided in the holder support 2 so that the holder support 2 can be elastically deformed. In this case, when sucking the fruit F2 displaced from the center axis of the vacuum suction pad 1, the vacuum suction pad 1 can completely suck the fruit F2 on the center axis of the vacuum suction pad 1 by using the characteristic of the pad main body 5 that is easily elastically deformed as described above and also by changing the direction of the vacuum suction pad 1 because of the elastic deformation of the holder support 2. Therefore, there is an advantage that the fruit F2 displaced more greatly can also be reliably sucked by the vacuum suction pad 1.

Those modification examples of the first embodiment are also applicable as modification examples of a second embodiment described later.

(Configuration of Vacuum Suction Pad According to Second Embodiment)

Next, a configuration of a vacuum suction pad 20 according to a second embodiment of the present invention will be described. FIG. 4 is a schematic cross-sectional view illustrating a vacuum suction pad 20 according to the second embodiment. Similarly to the vacuum suction pad 1 of the first embodiment, the vacuum suction pad 20 of the present embodiment includes a holder support portion 2, a pad holder 3, an air channel 4, a pad main body 21, a hollow 22, and a suction hole 23. Herein, the holder support 2, the pad holder 3, and the air channel 4 have the same configurations as those of the first embodiment, and thus the same reference signs as those of the first embodiment are used, and the description thereof is herein omitted.

The pad main body 21 is the same as the pad main body 5 of the first embodiment in that the pad main body is made from a closed cell sponge, but is different in shape. That is, as illustrated in FIG. 4, the pad main body 21 of the present embodiment includes: a main body portion 24 forming a base end portion of the pad main body 21; and a flat portion 25 forming a tip end portion of the pad main body 21. The main body portion 24 has a cylindrical outer shape and has a uniform thickness from a tip end side toward a base end side thereof. Meanwhile, the flat portion 25 is a flat surface extending in a direction orthogonal to a center axis of the vacuum suction pad 20, is thinner than the main body portion 24, and has a uniform thickness regardless of its radial position. Therefore, the entire surface of the flat portion 25 is more easily elastically deformed than the main body portion 24.

As illustrated in FIG. 4, the hollow 22 is a circular cross-section hole formed inside the main body portion 24 of the pad main body 21. The hollow 22 has an inner diameter D2 that is constant in size from a tip end side to a base end side thereof. The other points are the same as those of the hollow 6 of the first embodiment, and thus the description thereof is herein omitted.

As illustrated in FIG. 4, the suction hole 23 penetrates the flat portion 25 of the pad main body 21 and allows the hollow 22 to communicate with the outside. The suction hole 23 is formed in a circular cross-section, and an opening diameter d2 of the suction hole 23 is set to be smaller than the inner diameter D2 of the hollow 22. The other points are the same as those of the suction hole 7 of the first embodiment, and thus the description thereof is herein omitted.

Effects of Second Embodiment

Next, effects of the vacuum suction pad 20 according to the second embodiment will be described. Similarly to the vacuum suction pad 1 of the first embodiment, in a case where the vacuum suction pad 20 of the second embodiment sucks a fruit F1 having large unevenness on its surface, the vacuum suction pad 20 can easily achieve initial suction and can also secure large suction force when complete suction is achieved. That is, because the opening diameter d2 of the suction hole 23 is set to be smaller than the inner diameter D2 of the hollow 22, an edge portion of the suction hole 23 can be easily brought into close contact with a narrow region on the surface of the fruit F1 over the entire circumference in the circumferential direction. Therefore, it is possible to easily achieve the initial suction of the fruit F1 by the vacuum suction pad 20, regardless of existence of the large unevenness.

The vacuum suction pad 20 of the second embodiment is slightly inferior to the vacuum suction pad 1 of the first embodiment, in performance of sucking the fruit F2 displaced from the center axis of the vacuum suction pad. That is, the main body portion 24 of the pad main body 21 is less likely to be elastically deformed than the flat portion 25. Therefore, in a process in which the elastic deformation of the pad main body 21 expands from the flat portion 25 to the main body portion 24, a relative positional relationship between the fruit F2 and the vacuum suction pad 20 is slightly changed so that the center axis of the fruit F2 approaches the center axis of the vacuum suction pad 20. However, the flat portion 25 has a uniform thickness over the entire surface, and the main body portion 24 also has a uniform thickness from the tip end side to the base end side. Therefore, an effect that a degree of elastic deformation of the pad main body 21 becomes uniform regardless of a circumferential position thereof as the elastic deformation of the pad main body 21 expands toward the base end side is smaller than that of the first embodiment.

However, the pad main body 21 of the second embodiment has a simple shape, as compared with the pad main body 5 of the first embodiment. Therefore, the vacuum suction pad 20 of the second embodiment has an advantage of being manufactured by a simpler process at a lower cost, as compared with the vacuum suction pad 1 of the first embodiment.

Modification Examples of Second Embodiment

In the present embodiment, the flat portion 25 serving as the tip end portion of the pad main body 21 is thinner than the main body portion 24 serving as the base end portion of the pad main body 21 so that the tip end portion is more easily elastically deformed than the base end. However, instead of or in combination with this, the flat portion 25 may be made from a material having a Young's modulus lower than that of the main body portion 24 so that the tip end portion of the pad main body 21 is more easily elastically deformed than the base end portion thereof.

In the present embodiment, the main body portion 24 and the flat portion 25 of the pad main body 21 are both made from a closed cell sponge. However, the main body portion 24 and the flat portion 25 may be made from different materials having different air permeability. FIG. 5 is a schematic cross-sectional view illustrating a vacuum suction pad 30 according to a modification example of the present embodiment. In the vacuum suction pad 30, a main body portion 32 forming a pad main body 31 is made from a closed cell sponge, and a flat portion 33 is made from a semi-open cell sponge. Herein, the semi-open cell sponge means a sponge in which closed cells and open cells are mixed, and has characteristics of having air permeability and being easily elastically deformed, as compared with the closed cell sponge. The other configurations are the same as those of the second embodiment, and thus the same reference signs as those of the second embodiment are used, and the description thereof is herein omitted.

In a case where the flat portion 33 is made from the semi-open cell sponge as described above, the vacuum suction pad 30 sucks outside air not only through the suction hole 23 but also through the entire surface of the flat portion 33. Therefore, after initial suction of a fruit is achieved, the fruit is sucked with strong force by the entire surface of the flat portion 33 and the suction hole 23. Thus, there is an advantage that a contact region between the pad main body 31 and the fruit rapidly expands, thereby early achieving complete suction of the fruit. Further, even after the complete suction of the fruit is achieved, the fruit is sucked not only by the suction hole 23 but also by the entire surface of the flat portion 33. Thus, there is also an advantage that the suction force after the complete suction is achieved can be increased. The main body portion 32 of the pad main body 31 is made from a closed cell sponge having no air permeability, and thus achievement of the initial suction and complete suction of the fruit is not hindered by inflow and outflow of air through the main body portion 32.

INDUSTRIAL APPLICABILITY

A vacuum suction pad according to the present invention can be used not only for harvesting fruits but also for sucking an uneven object that does not return sufficient reaction force even when a pad main body is pressed against the object. For example, the vacuum suction pad according to the present invention can be used for conveying a deformed workpiece that is unstably placed or a workpiece that is easily displaced because of a weak friction with a ground contact surface.

LIST OF REFERENCE SIGNS

1 Vacuum suction pad
2 Holder support
3 Pad holder
4 Air channel
5 Pad main body
6 Hollow
7 Suction hole
8 Pad mounting portion
9 Main body portion
10 Tapered portion
20 Vacuum suction pad
21 Pad main body
22 Hollow
23 Suction hole
24 Main body portion
25 Flat portion
30 Vacuum suction pad
31 Pad main body
32 Main body portion
33 Flat portion
C1 Center axis
C2 Center axis
D1 Inner diameter
D2 Inner diameter
d1 Opening diameter
d2 Opening diameter
F1 Fruit
F2 Fruit

The invention claimed is:

1. A suction pad for sucking and holding an object, the suction pad comprising:
- a pad main body that is made from an elastically deformable member and has a held base end portion;
- a hollow that is formed inside the pad main body so as to extend from a base end side to a tip end side; and
- a suction hole that is configured to communicate with the hollow and is open to a tip end portion of the pad main body,
- wherein an opening diameter of the suction hole is smaller than an inner diameter of the hollow.

2. The suction pad according to claim 1, wherein the tip end portion of the pad main body is elastically deformable.

3. The suction pad according to claim 2, wherein the tip end portion of the pad main body is thinner than the held base end portion.

4. The suction pad according to claim 1, wherein the elastically deformable member includes a sponge.

5. The suction pad according to claim 4, wherein the pad main body includes the tip end portion made from a sponge having open cells and the held base end portion made from a sponge having closed cells.

6. The suction pad according to claim 1, wherein the pad main body includes, at the tip end portion, a tapered portion in which an inner diameter of the hollow decreases from the base end side toward the tip end side.

7. The suction pad according to claim 6, wherein the tapered portion is thinner on the tip end side than on the base end side.

* * * * *